(12) United States Patent
Huang

(10) Patent No.: US 7,663,821 B2
(45) Date of Patent: Feb. 16, 2010

(54) DEVICE AND METHOD FOR ASSEMBLING LENS INTO LENS BARREL

(75) Inventor: Chien-Feng Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/257,755

(22) Filed: Oct. 24, 2008

(65) Prior Publication Data

US 2009/0147382 A1    Jun. 11, 2009

(30) Foreign Application Priority Data

Dec. 11, 2007    (CN) .................. 2007 1 0202993

(51) Int. Cl.
*G02B 7/02* (2006.01)
(52) U.S. Cl. .................................... 359/819
(58) Field of Classification Search ............... 359/819, 359/811, 822; 33/507
See application file for complete search history.

(56) References Cited

U.S. PATENT DOCUMENTS 5,127,692 A * 7/1992 Yakou et al. .................. 294/2

* cited by examiner

*Primary Examiner*—Joseph Martinez
(74) *Attorney, Agent, or Firm*—Andrew C. Cheng

(57) ABSTRACT

A device for assembling a lens into a lens barrel is provided. The device includes a pressing rod and a sensing module positioned above the pressing rod. The pressing rod includes a first end and a second end opposite to the first end. The first end defines a first surface for pressing against the lens. The second end defines a second planar end surface. The sensing module includes a pressing surface for facing toward the second planar end surface, a number of force sensors mounted on the pressing surface, each force sensor being configured for sensing a counterforce applied thereto when the force sensors are pressed against the second planar end surface of the pressing rod.

11 Claims, 3 Drawing Sheets

DEVICE AND METHOD FOR ASSEMBLING LENS INTO LENS BARREL

BACKGROUND

1. Technical Field

The present invention generally relates to devices for assembling lens modules and, particularly, to a device and a method for assembling a lens to a lens barrel.

2. Description of Related Art

Nowadays, lens modules typically include a lens barrel and lenses received in the lens barrel. With the progress of the technology, it is required that the lens modules should be small in size and have a high imaging quality. As well known, the imaging quality of the lens modules is mainly depended on the assembling preciseness of the lens modules. In general, the assembling process of a lens module includes: picking up the lens and putting it into the lens barrel using a sucking apparatus; and pressing the lens into the lens barrel using a rod. The disadvantage of the above assembling process is that during the assembling process, it is difficult to inspect the position/angle of the lens relative to the optical axis of the lens barrel, thus the lens may not be accurately positioned in the lens barrel. As a result, the imaging quality of the lens module cannot be guaranteed.

What is needed, therefore, is an device for assembling a lens into a lens barrel, which can overcome the above mentioned problems.

DETAILED DESCRIPTION OF THE EMBODIMENTS

Figure 1:
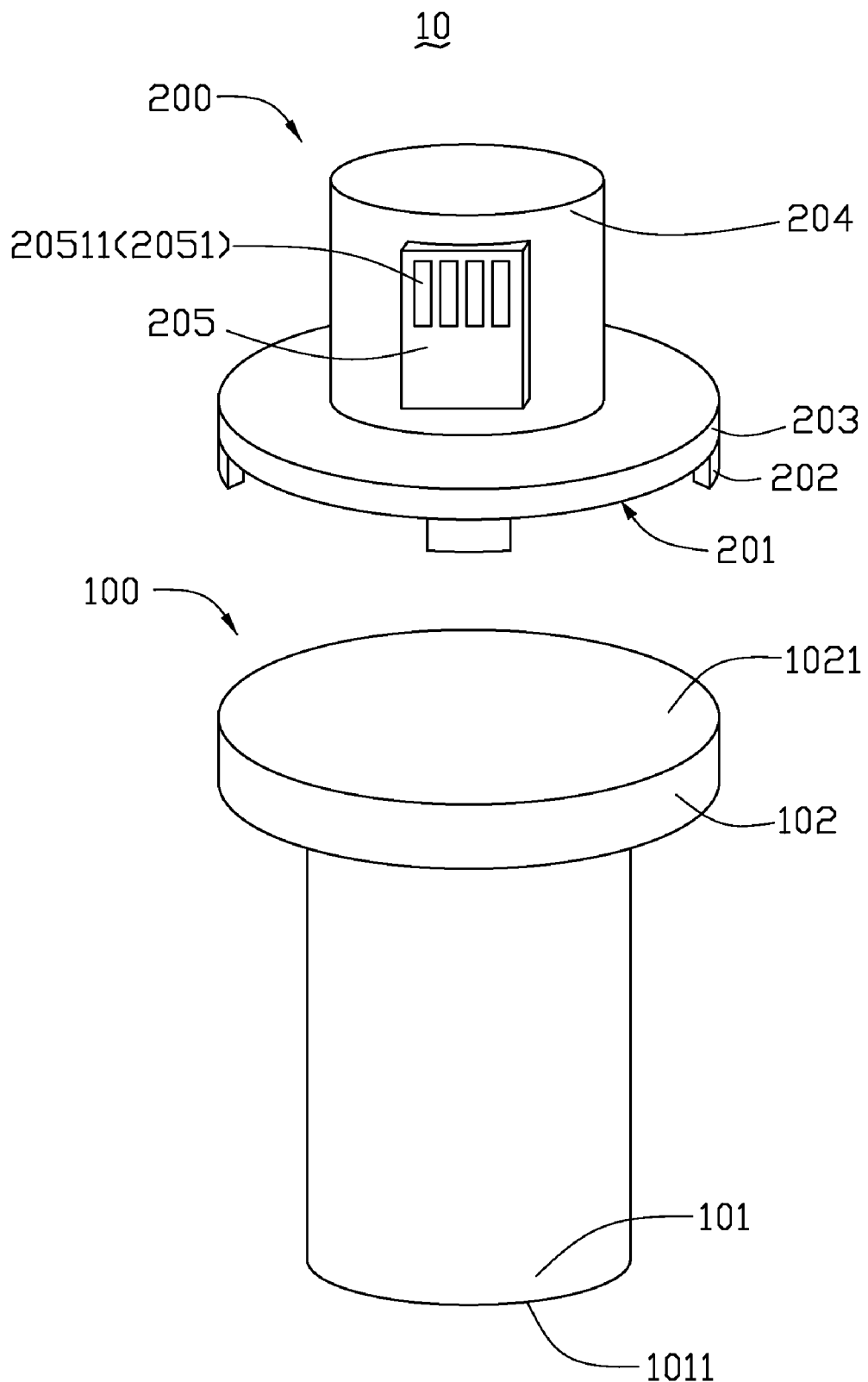
FIG. 1 is an isometric, schematic view of a device including a sensing module, according to an exemplary embodiment.

Referring to FIG. 1, a device 10 is shown. The device 10 includes a pressing rod 100 and a sensing module 200 positioned above the pressing rod 100. The pressing rod 100 includes a first end 101 and a second end 102 opposite to the first end 101. The first end 101 defines a first surface 1011 for pressing against the lens. The second end 102 defines a second planar end surface 1021. The sensing module 200 includes a pressing surface 201 for facing toward the second planar end surface 1021, a number of force sensors 202 mounted on the pressing surface 201, each force sensor 202 being configured for sensing a counterforce applied thereto when the force sensors 202 are pressed against the second planar end surface 1021 of the pressing rod 100.

The first end 101 is cylindrical in shape. The second end 102 is also cylindrical in shape, and the diameter of the second end 102 is greater than the diameter of the first end 101. The shape of the second end 102 is not restricted to cylinder, other shapes such as elliptical cylinder or prism can also be alternatively adapted.

The sensing module 200 includes a pressing plate 203 with the force sensor 202 mounted thereon and a handle 204 fixed to an opposite side of the pressing plate 203 to the force sensors 202, and the sensing module 200 further includes a display 205 for displaying the counterforce sensed by each force sensor 202.

The pressing plate 203 has the pressing surface 201, the shape of the pressing surface 201 is substantially the same as the second planar end surface 1021 of the pressing rod 100.

Figure 2:
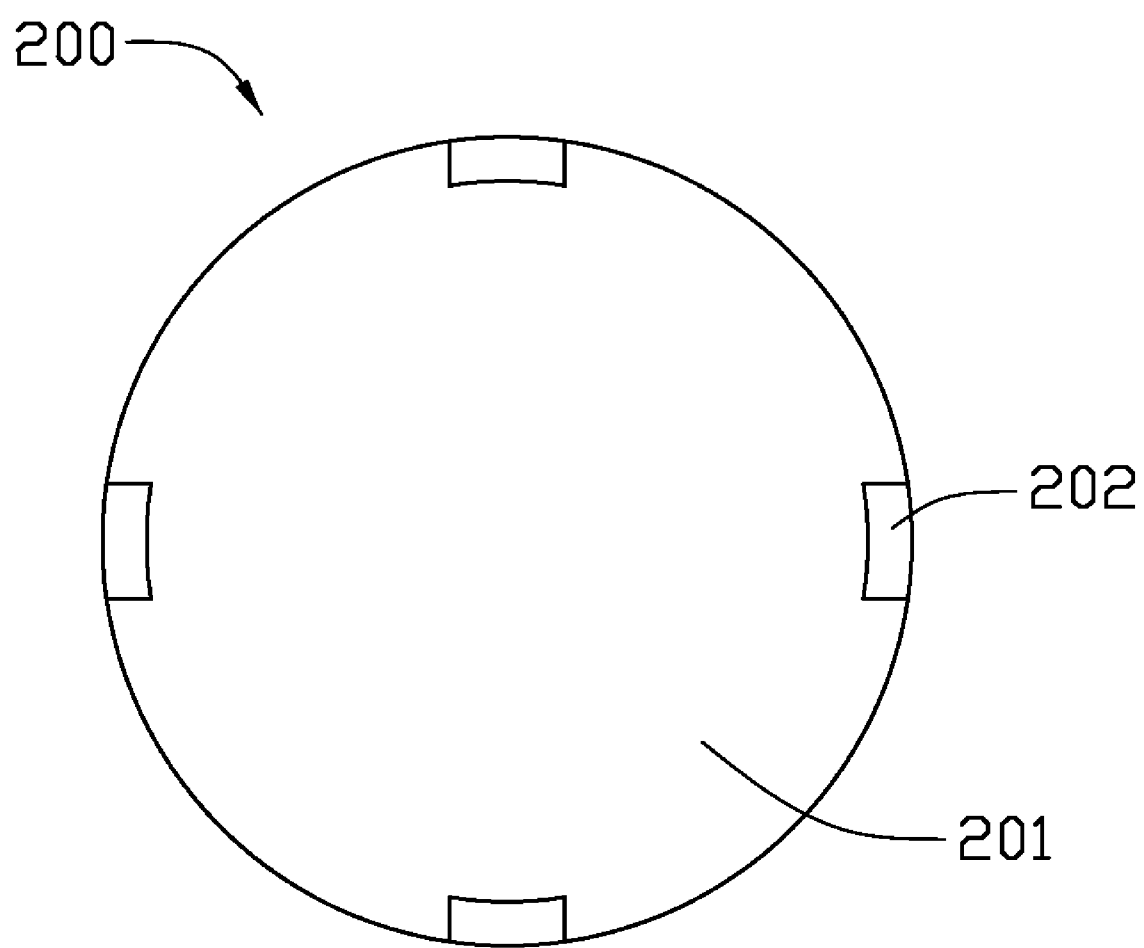
FIG. 2 is a bottom plan view of the sensing module of FIG. 1.

Each of the force sensors 202 is used for sensing a counterforce acted thereupon by the pressing rod 100. Referring to FIG. 2, the pressing surface 201 is circular in shape, the force sensors 202 are equadistantly distributed around an imaginary circle. The number of the force sensors 202 is four in this embodiment, but can vary depending on requirements in other alternative embodiments. The force sensors 202 are made from pizeoelectrical material such as piezoelectric crystal or piezoelectric polymeric.

The display 205 is electrically connected to the force sensors 202. The display 205 includes a converter (not shown) received in the handle 204 for converting the voltage signals from the force sensors 202 into display information associated with the sensed counterforces, and a display screen 2051 mounted on the handle 204 and configured for displaying the counterforces.

The display screen 2051 includes at least one light emitting diode panel 20511. In this embodiment, the number of the light emitting diode panels 20511 is equal to the number of the force sensors 202. Each light emitting diode panel 20511 is configured for displaying a counterforce value transmitted from a force sensor 201. Also the four light emitting diode panels 20511 can be replaced with a single light emitting diode panel capable of displaying all the counterforce values thereon. That is, the number of the light emitting diode panels is not limited to this embodiment.

Figure 3:
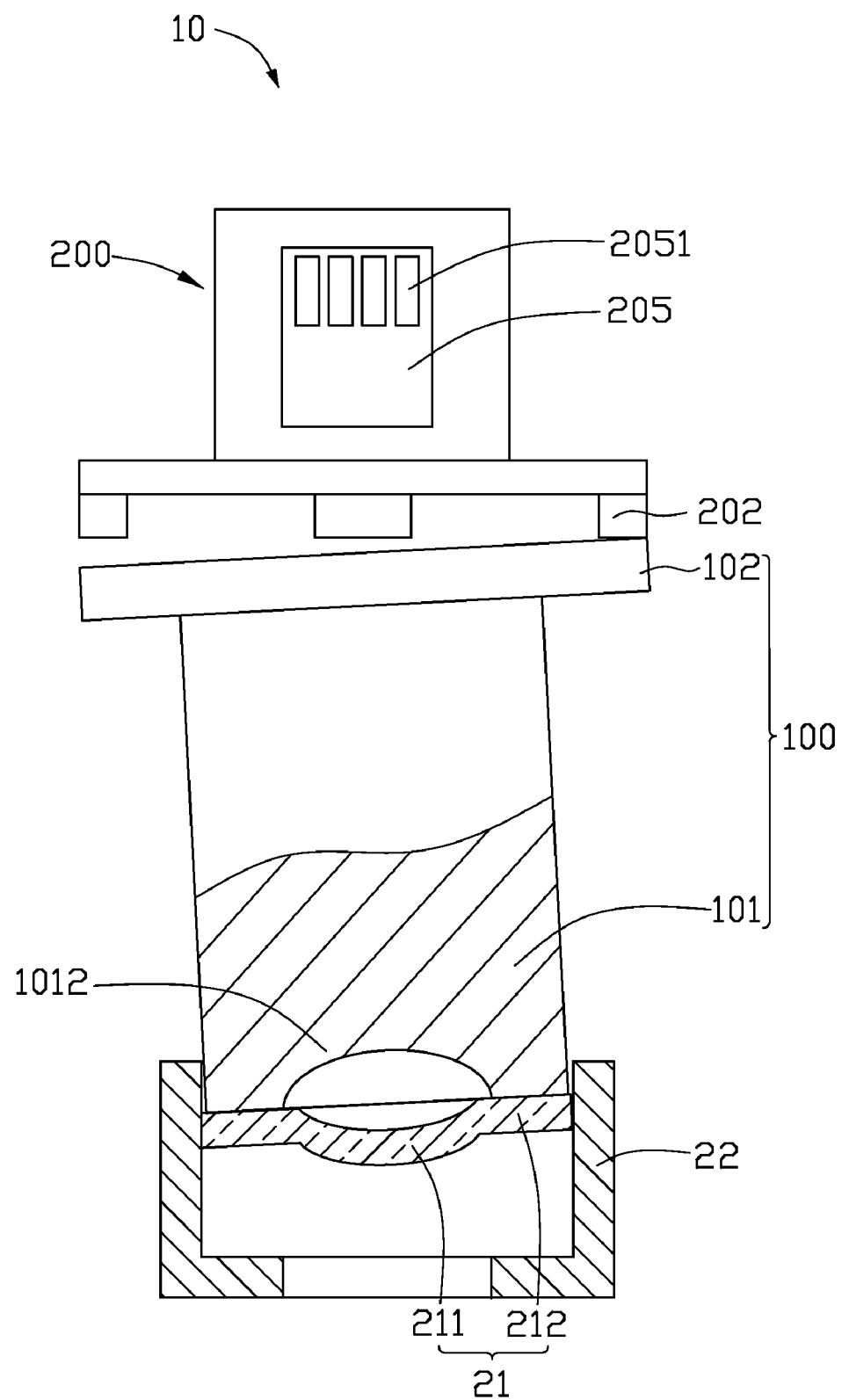
FIG. 3 is a partially sectional view showing a process of assembling a lens into a lens barrel using the device of FIG. 1.

Referring to FIG. 3, in operation, a lens barrel 22 is oriented substantially perpendicularly to a horizontal direction. Then a lens 21 is picked up by a sucking apparatus (not shown) and is disposed in a lens barrel 22, and the lens is pressed toward the lens barrel by using the substantially vertically oriented pressing rod 100. Next, the device 10 is used for detecting whether the lens 21 is tilted relative to the barrel 22 before the lens 21 is pressed into the barrel 22. The sensing module 200 is supported by a mechanical arm (not shown) so that the bottom surfaces of the force sensors 202 can be kept at a same horizontal surface. The mechanical arm drives the sensing module 200 to the pressing rod 100. When the counterforce values displayed by the display 205 does not equal to each other, the lens 21 and the pressing rod 100 are tilted relative to the lens barrel 22. The orientation of the lens 21 can then be adjusted until the counterforce values displayed by the light emitting diode panels 20511 are equal to each other, before that, the pressing rod 100 must be reoriented to a vertical orientation. Therefore, the device 10 can precisely measure the orientation of the lens 21 in the lens barrel 22.

The lens 21 includes a central imaging portion 211, accordingly, the first surface 1011 further defines a recess 1012 aligned with the central imaging portion 211, and a periphery portion 212. When assembling the lens 21 into the lens barrel 22, the periphery area 212 contacts the first end 101 of the pressing rod 100. The lens 21 is then pressed into the lens barrel 22 by the press rod 100.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A device for assembling a lens into a lens barrel, the device comprising:
   a pressing rod comprising a first end and a second end opposite to the first end, the first end defining a first surface for pressing against the lens, the second end defining a second planar end surface; and
   a sensing module comprising:
      a pressing surface for facing toward the second planar end surface; and
      a plurality of force sensors mounted on the pressing surface, each force sensor being configured for sensing a counterforce applied thereto when the force sensors are pressed against the second planner end surface of the pressing rod.

2. The device as claimed in claim 1, wherein the sensing module comprises a display for displaying the counterforce sensed by each force sensors.

3. The device as claimed in claim 1, wherein the pressing rod is cylindrical in shape.

4. The device as claimed in claim 2, wherein the sensing module comprises a pressing plate with the force sensors mounted thereon and a handle fixed to an opposite side of the pressing plate to the force sensors.

5. The device as claimed in claim 4, wherein the pressing plate has the pressing surface, which is circular in shape, the force sensors being equadistantly distributed around an imaginary circle.

6. The device as claimed in claim 4, wherein the display comprises a converter and a display screen, the converter being received in the handle and configured for converting the signals from the force sensor into display information associated with the counterforces, the display screen being mounted on the handle and configured for displaying the counterforces.

7. The device as claimed in claim 6, wherein the display screen includes at least one emitting diode panel.

8. The device as claimed in claim 1, wherein the force sensors are made from pizeoelectrical material.

9. The device as claimed in claim 8, wherein the pizeoelectrical material is selected from the group consisting of: piezoelectric ceramic, piezoelectric crystal and piezoelectric polymeric.

10. A process for assembling a lens in a lens barrel comprising:
    orienting a lens barrel such that an optical axis thereof is perpendicular to a horizontal direction;
    disposing a lens in the lens barrel;
    pressing the lens toward the lens barrel using a substantially vertically oriented pressing rod, the pressing rod having a first end for abutting against the lens, and an opposite second end; and
    pressing the pressing rod using a sensing module, the sensing module comprising a pressing flat surface, and a plurality of force sensors mounted on the pressing flat surface, the pressing flat surface being horizontally oriented and facing toward the second end of the pressing rod, each of the force sensors being configured for pressing against the second end of the pressing rod and sensing a counterforce applied thereto by the second end.

11. The process as claimed in claim 10, wherein the process further comprising reorienting the lens to a vertical orientation based on the sensed counterforces.

* * * * *